United States Patent [19]

Grigsby, Jr. et al.

[11] Patent Number: 4,609,684

[45] Date of Patent: Sep. 2, 1986

[54] RIM PRODUCTS MADE FROM ISATOIC ANHYDRIDE DERIVATIVES OF POLYOXYALKYLENE POLYAMINES

[75] Inventors: Robert A. Grigsby, Jr., Georgetown; Richard J. G. Dominguez, Austin, both of Tex.

[73] Assignee: Texaco Inc., White Plains, N.Y.

[21] Appl. No.: 747,528

[22] Filed: Jun. 21, 1985

[51] Int. Cl.⁴ ............................................. C08G 18/14
[52] U.S. Cl. ...................................... 521/163; 528/79
[58] Field of Search .......................... 521/163; 528/79

[56] References Cited

U.S. PATENT DOCUMENTS

| | | |
|---|---|---|
| 3,256,213 | 6/1966 | Smitter et al. |
| 3,808,250 | 4/1974 | Blahak et al. |
| 3,975,428 | 8/1976 | Blahak et al. |
| 4,016,143 | 4/1977 | Blahak et al. |
| 4,136,091 | 1/1979 | Mazanek et al. |
| 4,169,206 | 9/1979 | Mazanek et al. |
| 4,180,644 | 12/1979 | Marquis et al. |
| 4,191,706 | 3/1980 | Marquis et al. |
| 4,194,070 | 3/1980 | Marquis et al. |
| 4,239,700 | 12/1980 | Marquis et al. |
| 4,260,557 | 4/1981 | Mazanek et al. |
| 4,328,322 | 5/1982 | Baron |
| 4,504,278 | 3/1985 | Sung |
| 4,515,981 | 5/1985 | Otani et al. |
| 4,530,941 | 7/1985 | Turner et al. |

FOREIGN PATENT DOCUMENTS 0081701  11/1982  European Pat. Off.

OTHER PUBLICATIONS

Clark and Wagner, "Isatoic Anhydride. I. Reactions with Primary and Secondary Amines and with Some Amides," J. Org. Chem. 9, 55–67 (1944).
Staiger and Wagner, "Isatoic Anhydride. II. Reactions of Isatoic Anhydride with Ammonia," J. Org. Chem. 13, 347–352 (1948).
Staiger and Wagner, "Isatoic Anhydride. III. Reactions with Primary and Secondary Amines," J. Org. Chem. 18, 1427–1429 (1953).
Staiger and Miller, "Isatoic Anhydride. IV. Reactions with Various Nucleophiles," J. Org. Chem. 24, 1214–1219 (1959).
"Isatoic Anhydride Derivatives," Technical Bulletin 152, Sherwin Williams Chemicals (1975).

Primary Examiner—Maurice J. Welsh
Attorney, Agent, or Firm—Jack H. Park; Kenneth R. Priem

[57] ABSTRACT

Reaction injection molded (RIM) elastomers are made in a one-shot process from certain aromatic-amine amides which comprise the reaction product of a polyoxyalkylene polyamine selected from the group consisting of diamines, triamines and mixtures thereof, and having an average molecular weight of above about 3000 and an isatoic anhydride of the formula:

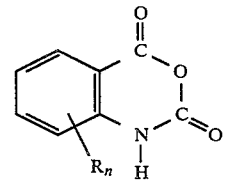

where R is selected from the group consisting of hydrogen, alkyl, nitro, halo, hydroxy, amino and cyano and n is a number of 1–4. Such elastomers have improved tensile strength, tear strength and elongation properties.

6 Claims, No Drawings 4,609,684

RIM PRODUCTS MADE FROM ISATOIC ANHYDRIDE DERIVATIVES OF POLYOXYALKYLENE POLYAMINES

CROSS-REFERENCE TO RELATED APPLICATIONS

This application is related to Ser. No. 747527, Ser. No. 747521, all filed of even date.

BACKGROUND OF THE INVENTION

1. Field of the Invention

Reaction injection molded (RIM) materials based on the reaction of a high molecular weight polyoxyalkylene polyamine and an aromatic isocyanate provide valuable materials for use in the automotive industry.

2. Description of Other Publications in the Field

U.S. Pat. Nos. 4,433,067; 4,396,729 and 4,444,910 are examples of reaction injection molded (RIM) products.

U.S. Pat. Nos. 4,191,706; 4,180,644; 4,194,070 and 4,239,700 disclose the manufacture and use of reaction products of polyoxyalkylene amines with an isatoic anhydride to form crosslinkers for use as polyurethane chain extenders.

The invention embodied herein discloses the manufacture and use of a higher molecular weight polyoxyalkylene polyamine than disclosed and/or claimed in these four patents reacted with an isatoic anhydride which is then formed into a RIM elastomer.

Further objects of our invention will be apparent to those skilled in the art in view of the aforementioned background and the following discussion and accompanying examples. nitro, halo, hydroxy, amino and cyano, and n is a number of 1–4.

SUMMARY OF THE INVENTION

The invention is a reaction injection molded (RIM) elastomer made by reacting an aromatic isocyanate with a compound made by reacting a polyoxyalkylene polyamine selected from the group consisting of triamines wherein the alkylene is ethylene, propylene or butylene, having an average molecular weight of above about 400 to 10,000 and diamines of the formula:

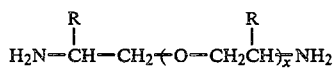

wherein x is an integer of at least about 2.6 to 84 and R is hydrogen, methyl or ethyl, and an isatoic anhydride of the formula:

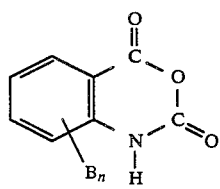

where B is selected from the group consisting of hydrogen, alkyl, nitro, halo, hydroxy, amino and cyano and n is a number from 1 to 4.

DESCRIPTION OF THE PREFERRED EMBODIMENTS

Compounds prepared from triamines have the following structural formula:

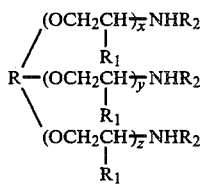

where R is an alkyl or aryl group and where $R_1$ is hydrogen, methyl or ethyl, where the sum of x, y and z is from about 5 to about 175, and where $R_2$ is hydrogen or the group:

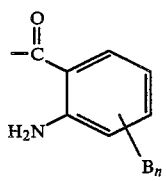

where B is selected from the group consisting of hydrogen, alkyl, nitro, halo, hydroxy, amino and cyano and n is a number from 1 to 4 where said group must be present in at least one occurrence.

In order to prepare the above compounds an isatoic anhydride of the formula:

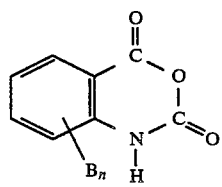

where B is selected from the group consisting of hydrogen, alkyl, nitro, halo, hydroxy, amino and cyano and n is a number of from 1 to 4, is reacted with a polyoxyalkylene polyamine. The isatoic anhydrides are well known materials and their preparation need not be discussed in detail. A preferred reactant is isatoic anhydride itself, where $B_n$ is H.

Polyoxyalkylene polyamines, and procedures for their preparation, useful in producing the compounds of the invention are well known and amply described in the literature. See, for example, U.S. Pat. No. 3,654,370.

In accordance with the invention, we employ polyoxyalkylenediamines of the formula:

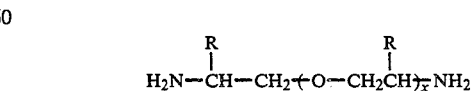

wherein x is an integer of from about 2.6 to 84, preferably from about 41 to 84, and R is hydrogen, methyl or ethyl, preferably methyl, and polyoxyalkylene triamines of the formula:

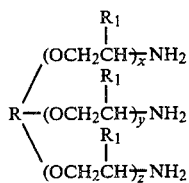

where R is an alkyl or aryl and where the sum of x, y and z is from about 5 to about 175, preferably from about 53 to 175 and $R_1$ is hydrogen, methyl or ethyl, preferably methyl. Preferred polyoxyalkylene triamines of the above formula have average molecular weights between above about 3200 to about 7000. Especially preferred is a triamine of molecular weight between about 4500 to 5500. Polyoxyalkylene di- and triamines are readily available commercially such as those sold by Texaco Chemical Co., Inc., Bellaire, Tex., under the trademark JEFFAMINE ®.

In order to make the isatoic anhydride modified polyoxyalkylene polyamine, the above reactants are simply mixed together without necessity of solvent or diluent and heated. When the reaction is finished, the product requires no further treatment or purification. The addition, no catalyst is necessary to effect the reaction although optional use of a catalyst is within the scope of the invention. The products are generally liquid rather than crystalline solids. The temperature of reaction may range from about 0° C. to about 200° C. at a pressure ranging from atmospheric pressure to about 1000 psig.

For example, when one mole of the isatoic anhydride is added per mole of diamine only one of the terminal amine groups is reacted to produce a monoamide also containing one aromatic and one aliphatic amine group. On the other hand, if two moles of the anhydride are reacted with one mole of the diamine both terminal groups are reacted to produce a diamine structure containing two aromatic amine groups. A corresponding situation, of course, exists with respect to reaction of the isatoic anhydride, for example, with a triamine. That is, 1, 2 or 3 of the terminal amines may be reacted to produce a mono-, di- or triamide amine structure.

A single high molecular weight isatoic anhydride derivative of an amine terminated polyether (polyoxyalkylene polyamine) resin may be used to prepare the RIM product. Also, mixtures of high molecular weight amine terminated polyols such as mixtures of di- and trifunctional materials and/or different molecular weight or different chemical composition materials may be used.

Useful chain extenders include low molecular weight linear diols such as 1,4-butane diol, propylene glycol and ethylene glycol. Ethylene glycol is especially preferred. Other chain extenders, including cyclic diols such as 1,4-cyclohexane diol would also be suitable as chain extenders in the practice of this invention. These chain extenders may be used alone or in combination.

Useful aromatic amine terminated chain extenders include, for example, 1-methyl-3,5-diethyl-2,6-diaminobenzene and 1-methyl-3,5-diethyl-2,4-diaminobenzene (which materials are also called diethyltoluene diamine or DETDA), 1,3,5-triethyl-2,6-diaminobenzene, 3,5,3',5'-tetraethyl-4,4'-diaminodiphenylmethane and the like. Particularly preferred aromatic diamine chain extenders are 1-methyl-3,5-diethyl-2,4-diaminobenzene or a mixture of this compound with 1-methyl-3,5-diethyl-2,6-diaminobenzene. It is within the scope of this invention to include some aliphatic chain extender materials as described in U.S. Pat. Nos. 4,246,363 and 4,269,945.

A wide variety of aromatic polyisocyanates may be used. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

The isocyanate may also be in the form of a quasi-prepolymer which is the reaction product of an excess of aromatic isocyanate and a hydroxy compound.

By far the most preferred aromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

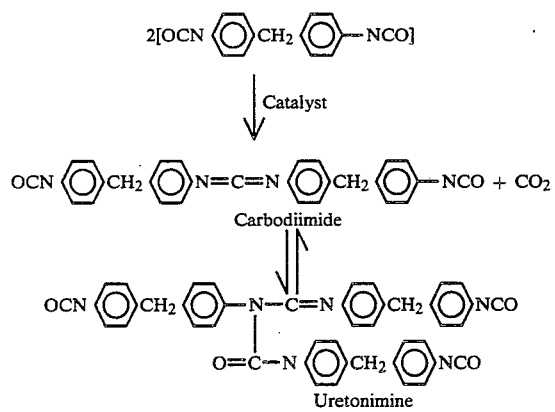

Examples of commercial materials of this type are Upjohn's ISONATE ®125M (pure MDI) and ISONATE 143L ("liquid" MDI). Preferably the amount of isocyanates used is the stoichiometric amount based on all the ingredients in the formulation or greater than the stoichiometric amount.

Catalysts such as tertiary amines or an organic tin compound or other polyurethane catalysts may be used. The organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethylether, etc.), 1,4-dimethylpiperazine, triethylenediamine, etc., and aliphatic polyamines such as N,N,N'N'-tetramethyl-1,3-butanediamine.

Other conventional formulation ingredients may be employed as needed such as; for example, foam stabilizers, also known as silicone oils or emulsifiers. The foam stabilizers may be an organic silane or siloxane. For example, compounds may be used having the formula:

$$RSi[O\text{---}(R_2SiO)_n\text{---}(oxyalkylene)_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Reinforcing materials, if desired, are known to those skilled in the art. For example, chopped or milled glass fibers, chopped or milled carbon fibers and/or other mineral fibers are useful.

Post curing of the elastomer may be desirable. Post curing will improve some properties such as heat sag. Employment of post curing depends on the desired properties of the end product.

The examples which follow exemplify the improvement obtained by the process of this invention. However, these examples are not intended to limit the scope of the invention.

Each of the example RIM formulations which follow were processed on an Accuratio VR-100 high pressure impingement mixing RIM machine. The impingement mixing pressures were about 2,000 psi and the material was injected into a steel flat plaque mold after mixing. The mold is milled to produce plaques which are 18"×18"×⅛". The mold temperature is typically 150°-160° F.

| GLOSSARY | |
|---|---|
| JEFFAMINE ® T-5000 | A 5000 molecular weight polyoxypropylenetriamine. A product of Texaco Chemical Co., Bellaire, TX. |
| ISONATE ® 143L | A liquid MDI product. A product of the Upjohn Co. |
| THANOL ® SF-5505 | A 5500 molecular weight polyoxyalkylene triol with a high percentage of terminal hydroxyl groups derived from ethylene oxide. |

EXAMPLE 1

This example described the synthesis of the modified polyamine used in the following examples. JEFFAMINE T-5000 polyamine (70.0 lb) was charged to a clean 10-gallon kettle. The reaction was purged with nitrogen and isatoic anhydride (2.09 lb) was added. The reaction was heated to 40° C. for one hour and then heated to 50° C. for another hour. The temperature of the kettle was again raised and held for one hour at 90° C. The brown liquid product (71.9 lb) was removed from the reactor at 50° C. Amine analysis for this example indicated a total amine value of 0.50 meq/g.

EXAMPLE 2

The following formulation was processed in a RIM machine (Accuratio VR-100) to prepare a RIM elastomer. This example is used as a comparison to Example 3.

| B-Component | |
|---|---|
| JEFFAMINE ® T-5000, pbw | 49.5 |
| Diethyltoluenediamine, pbw | 8.7 |
| A-Component | |
| Upjohn Code 231 Isocyanate, pbw (1 ISONATE 143L/1 THANOL ® SF-5505) | 41.7 |

EXAMPLE 3

The following formulation was processed in a RIM machine (Accuratio VR-100). This example is used as a comparison to Example 2.

| B-Component | |
|---|---|
| Modified amine*, pbw | 50.0 |
| Diethyltoluenediamine, pbw | 8.8 |
| A-Component | |
| Upjohn Code 231 Isocyanate, pbw | 41.2 |
| (1 ISONATE 143L/1 THANOL SF-5505) | |

*As in Example 1.

Both examples were shot into a 18"×18"×18" mold. For example 1, the material did not fill the mold completely (¾ fill). For Example 2, the material filled the mold completely under the same conditions. The modified amine is slower to gel than JEFFAMINE T-5000. This slower gelation speed is very important in that larger parts can be filled with the modified amine than with JEFFAMINE T-5000.

We claim:

1. A reaction injection molded elastomer made from an aromatic isocyanate and a compound comprising a reaction product of a polyoxyalkylene polyamine selected from the group consisting of triamines wherein the alkylene is ethylene, propylene or butylene, having an average molecular weight of about 400 to 10,000 and diamines of the formula:

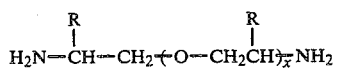

wherein x is an integer of at least about 2.6 to 84 and R is hydrogen, methyl or ethyl, and an isatoic anhydride of the formula:

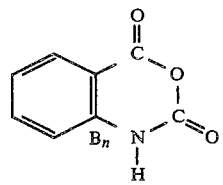

where B is selected from the group consisting of hydrogen, alkyl, nitro, halo, hydroxy, amino and cyano, and n is a number of 1–4.

2. A reaction injection molded elastomer as in claim 1 where R is methyl and the traimine is a poloxypropylene triamine.

3. A reaction injection molded elastomer as in claim 1 wherein the polyoxyalkylene polyamine is a polyoxypropylene triamine having an average molecular weight of about 400 to 10,000.

4. A reaction injection molded elastomer as in claim 3 wherein the triamine has a molecular weight between above about 3200 to about 7000.

5. A reaction injection molded elastomer as in claim 4 wherein the triamine has a molecular weight between above about 4500 to 5500.

6. A reaction injection molded elastomer as in claim 1 wherein x is an integer from about 41 to 84.

* * * * *